(12) United States Patent
Naik et al.

(10) Patent No.: US 12,146,564 B2
(45) Date of Patent: Nov. 19, 2024

(54) AXLE ASSEMBLY HAVING A LUBRICANT DEFLECTOR

(71) Applicant: ArvinMeritor Technology, LLC, Troy, MI (US)

(72) Inventors: Mahesh I. Naik, Bangalore (IN); Hari Kishore Kasula, Bangalore (IN); Nagaraja Eranna, Bangalore (IN); Abdullah Muhammad, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 18/193,791

(22) Filed: Mar. 31, 2023

(65) Prior Publication Data

US 2024/0068555 A1 Feb. 29, 2024

(30) Foreign Application Priority Data

Aug. 30, 2022 (IN) .............................. 202211049563

(51) Int. Cl.
*F16H 57/037* (2012.01)
*F16H 57/04* (2010.01)
*F16H 57/02* (2012.01)
*F16H 57/021* (2012.01)

(52) U.S. Cl.
CPC ....... *F16H 57/0423* (2013.01); *F16H 57/037* (2013.01); *F16H 57/0424* (2013.01); *F16H 57/0457* (2013.01); *F16H 57/0471* (2013.01); *F16H 57/0483* (2013.01); *F16H 2057/02052* (2013.01); *F16H 57/021* (2013.01)

(58) Field of Classification Search
CPC ............... F16H 57/0423; F16H 57/037; F16H 57/0457; F16H 57/0471; F16H 57/0483; F16H 2057/02052; F16H 57/0421; F16H 57/021
USPC ........ 475/160; 184/6.12, 13.1, 6.27; 74/467, 74/468, 606 A, 606 R
See application file for complete search history.

(56) References Cited

U.S. PATENT DOCUMENTS 3,182,527 A * 5/1965 Bryan ................. F16H 57/0483
475/160
4,004,472 A * 1/1977 Millward ................ F16H 48/08
475/247
4,227,427 A * 10/1980 Dick ..................... F16C 19/548
184/6.12

(Continued)

FOREIGN PATENT DOCUMENTS

| DE | 1047820 B | 12/1958 | | |
|---|---|---|---|---|
| JP | 2001159460 A | * | 6/2001 | ......... F16H 57/0457 |
| WO | WO-2023099120 A1 | * | 6/2023 | ......... F16H 57/0409 |

OTHER PUBLICATIONS

Raya et al.; U.S. Appl. No. 17/846,255, filed Jun. 22, 2022; 28 Pages.

(Continued)

*Primary Examiner* — Roger L Pang
(74) *Attorney, Agent, or Firm* — Brooks Kushman PC

(57) ABSTRACT

An axle assembly having a differential carrier, a differential assembly, a drive pinion, a spigot bearing, and a lubricant deflector. The drive pinion has a spigot. The spigot is rotatably supported by the spigot bearing. The lubricant deflector is mounted to the differential carrier and directs lubricant to the spigot bearing.

22 Claims, 7 Drawing Sheets

(56) References Cited

U.S. PATENT DOCUMENTS

| | | | |
|---|---|---|---|
| 7,189,178 B2* | 3/2007 | Weith | F16H 57/0483 |
| | | | 184/6.12 |
| 7,913,816 B2* | 3/2011 | Shimizu | B60T 1/062 |
| | | | 184/6.12 |
| 8,167,758 B2* | 5/2012 | Downs | F16H 57/0483 |
| | | | 184/6.12 |
| 8,746,406 B2 | 6/2014 | Perakes et al. | |
| 8,858,379 B2 | 10/2014 | Keeney et al. | |
| 11,149,837 B2* | 10/2021 | Lemmers, Jr | F16H 61/16 |
| 2001/0005703 A1* | 6/2001 | Iwata | F16H 57/0483 |
| | | | 475/159 |
| 2016/0377164 A1* | 12/2016 | Fast | F16H 57/0483 |
| | | | 475/160 |
| 2019/0054816 A1 | 2/2019 | Garcia et al. | |
| 2019/0054817 A1 | 2/2019 | Garcia et al. | |
| 2019/0054818 A1 | 2/2019 | Garcia et al. | |
| 2020/0173494 A1 | 6/2020 | Smith et al. | |
| 2020/0173531 A1 | 6/2020 | Smith | |
| 2020/0173535 A1 | 6/2020 | Peng et al. | |
| 2020/0173537 A1 | 6/2020 | Begov et al. | |
| 2020/0173541 A1 | 6/2020 | Soffner et al. | |
| 2020/0177049 A1 | 6/2020 | Raya et al. | |
| 2020/0177059 A1 | 6/2020 | Smith et al. | |
| 2021/0190200 A1* | 6/2021 | Itou | F16H 55/17 |

OTHER PUBLICATIONS

Extended European Search Report dated Jan. 29, 2024 for related European Appln. No. 23192178.4, 8 Pages.

* cited by examiner

AXLE ASSEMBLY HAVING A LUBRICANT DEFLECTOR

TECHNICAL FIELD

This relates to an axle assembly that has a lubricant deflector.

BACKGROUND

An axle assembly having a differential assembly is disclosed in U.S. Patent Publication No. 2019/0054816.

SUMMARY

In at least one embodiment an axle assembly is provided. The axle assembly includes a housing assembly, a differential assembly, a drive pinion, a spigot bearing, and a lubricant deflector. The housing assembly includes an axle housing and a differential carrier. The differential carrier is mounted to the axle housing. The axle housing has a sump portion that receives lubricant. The differential assembly is mounted to the differential carrier. The differential assembly is rotatable about a differential axis. The differential assembly has a ring gear. The drive pinion is rotatable about a drive pinion axis. The drive pinion has a gear portion, a shaft portion, and a spigot. The gear portion meshes with the ring gear. The shaft portion extends from the gear portion away from the differential assembly. The spigot extends from the gear portion toward the differential assembly. The spigot bearing is disposed on the differential carrier. The spigot bearing rotatably supports the spigot of the drive pinion. The lubricant deflector is mounted to the differential carrier. The lubricant deflector is configured to direct lubricant to the spigot bearing.

The lubricant deflector may be configured to direct lubricant that is splashed or sprayed by the ring gear to the spigot bearing. The spigot, the spigot bearing, the lubricant deflector, or combinations thereof may be disposed above the differential axis.

The differential carrier may include a first spigot bearing support wall. The first spigot bearing support wall may encircle the spigot bearing. The lubricant deflector may be mounted to the first spigot bearing support wall.

The differential carrier may include a second spigot bearing support wall. The second spigot bearing support wall may extend from the first spigot bearing support wall to an exterior wall of the differential carrier. The second spigot bearing support wall may define a trench. The trench may route lubricant toward the lubricant deflector. The second spigot bearing support wall may be disposed above the drive pinion. The second spigot bearing support wall may be disposed at an oblique angle with respect to the drive pinion axis.

The second spigot bearing support wall may include a rib. The rib may extend away from the drive pinion. The rib may partially define the trench. The rib may be disposed above the drive pinion axis.

The differential carrier may include a third spigot bearing support wall. The third spigot bearing support wall may extend from the first spigot bearing support wall. The third spigot bearing support wall may be disposed below the drive pinion. The second spigot bearing support wall and the third spigot bearing support wall may extend farther from the drive pinion axis as the distance from the first spigot bearing support wall increases.

The lubricant deflector may include a first panel. The first panel may be spaced apart from the differential carrier to provide a gap. The gap may be configured to allow lubricant to pass between the first panel and the differential carrier.

A boss may extend from the first panel to the differential carrier. A fastener may couple the boss to the differential carrier. The boss may encircle the fastener.

The lubricant deflector may include a second panel. The second panel may extend at an angle from the first panel. The second panel may extend away from the drive pinion axis and the spigot bearing.

The lubricant deflector may include a third panel. The third panel may extend from the first panel toward the spigot bearing. A portion of the third panel may extend along an arc. The third panel may be radially disposed with respect to the drive pinion axis.

The lubricant deflector may include a first side flange. The first side flange may extend from the first panel. The first side flange may extend from the third panel. The first side flange may extend away from the differential assembly.

The lubricant deflector may include a second side flange. The first side flange may be disposed opposite the second side flange. The second side flange may extend from the first panel. The second side flange may extend from the third panel. The second side flange may extend away from the differential assembly.

The lubricant deflector may include a third side flange. The third side flange may extend from the first panel toward the differential assembly. The first side flange may be disposed opposite the third side flange.

The lubricant deflector may include a fourth side flange. The fourth side flange may extend from the first panel toward the differential assembly. The third side flange may be spaced apart from the fourth side flange. The second side flange may be disposed opposite the fourth side flange.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As required, detailed embodiments of the present invention are disclosed herein. It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
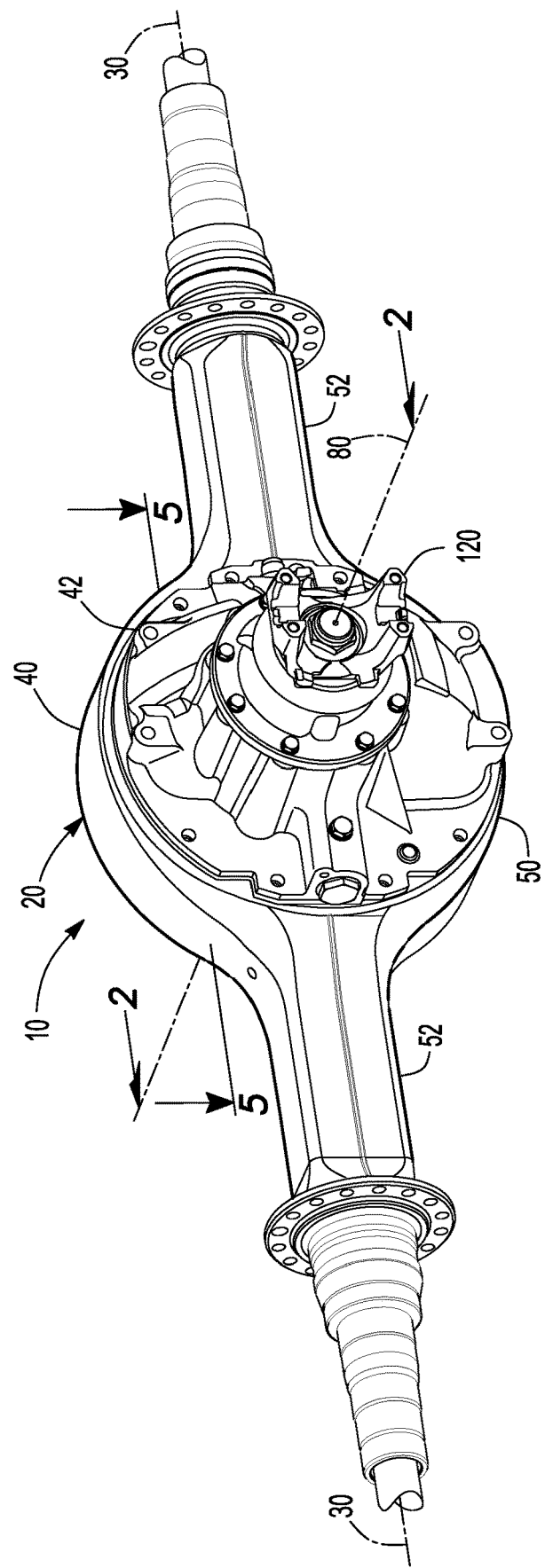
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis.

Figure 2:
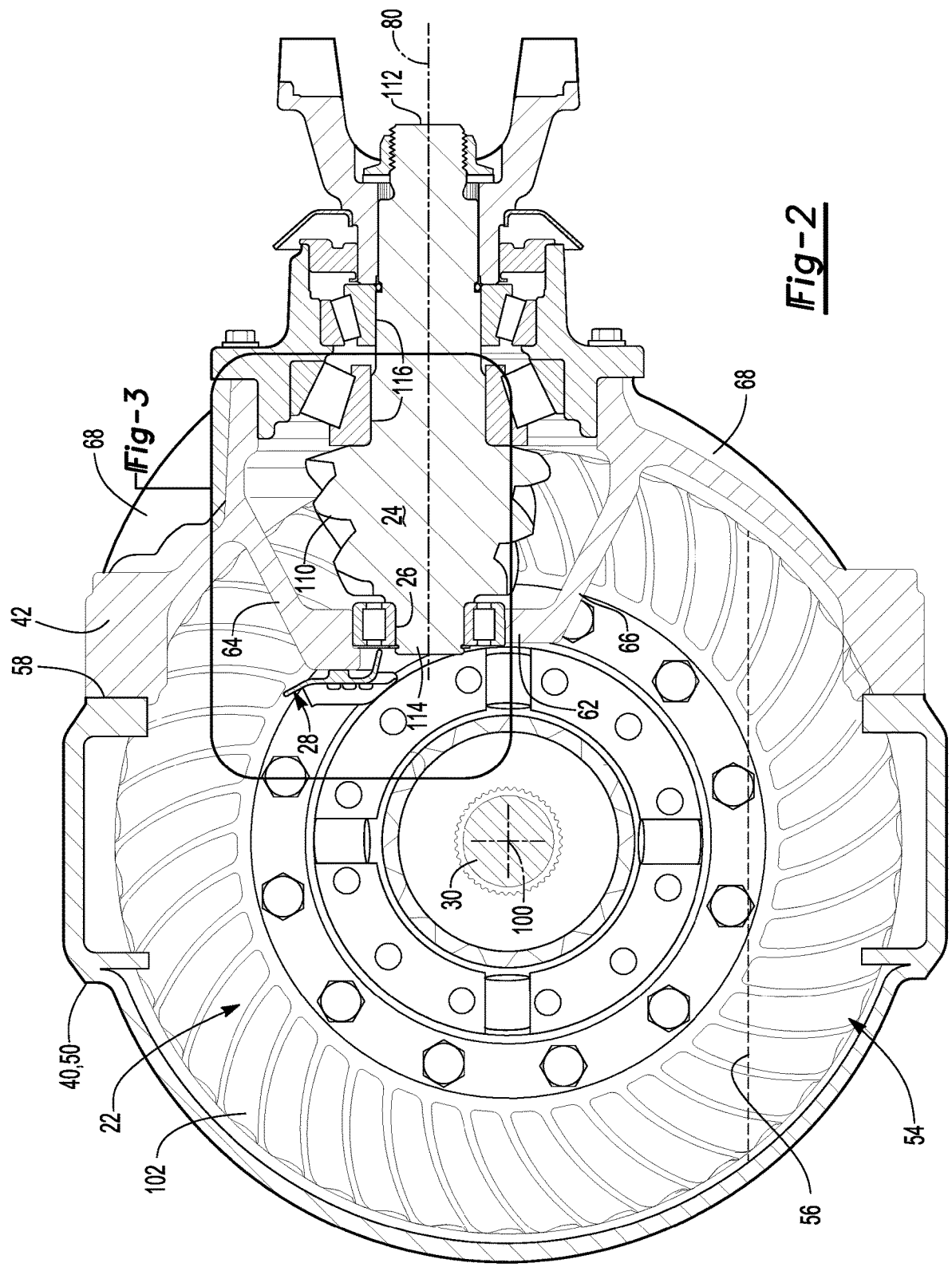
FIG. 2 is a section view of the axle assembly along section line 2-2.

One or more axle assemblies may be provided with the vehicle. As is best shown with reference to FIG. 1, the axle assembly 10 includes a housing assembly 20. As is best shown in FIG. 2, the axle assembly 10 includes a differential assembly 22, a drive pinion 24, a spigot bearing 26, and a lubricant deflector 28. In addition, the axle assembly 10 may include at least one axle shaft 30.

Referring to FIG. 1, the housing assembly 20 receives various components of the axle assembly 10. In addition, the housing assembly 20 may facilitate mounting of the axle assembly 10 to the vehicle. In at least one configuration, the housing assembly 20 includes an axle housing 40 and a differential carrier 42.

The axle housing 40 may receive and may support the axle shafts 30. In at least one configuration, the axle housing 40 may include a center portion 50 and at least one arm portion 52.

The center portion 50 may be disposed proximate the center of the axle housing 40. The center portion 50 may define a cavity that may at least partially receive the differential assembly 22. As is best shown in FIG. 2, a lower region of the center portion 50 at least partially defines a sump portion 54 that may receive, contain, or collect lubricant 56. Lubricant 56 in the sump portion 54 may be splashed or sprayed by a ring gear 102 of the differential assembly 22 and distributed to lubricate various components. The level of lubricant 56 in the sump portion 54 may be higher or lower than is illustrated in FIG. 2.

The center portion 50 may include a carrier mounting surface 58. The carrier mounting surface 58 may facilitate mounting of the differential carrier 42 to the axle housing 40. For example, the carrier mounting surface 58 may face toward and may engage the differential carrier 42 and may have a set of holes that may be aligned with corresponding holes on the differential carrier 42. Each hole may receive a fastener, such as a bolt or stud, that may couple the differential carrier 42 to the axle housing 40.

Referring to FIG. 1, one or more arm portions 52 may extend from the center portion 50. For example, two arm portions 52 may extend in opposite directions from the center portion 50 and away from the differential assembly 22. The arm portions 52 may have substantially similar configurations. For instance, the arm portions 52 may each have a hollow configuration or tubular configuration that may extend around and may receive a corresponding axle shaft 30 and may help separate or isolate the axle shaft 30 or a portion thereof from the surrounding environment. Each arm portion 52 may support a wheel hub and a brake assembly that is configured to brake the wheel hub and hence brake a wheel that is mounted to the wheel hub. An arm portion 52 or a portion thereof may or may not be integrally formed with the center portion 50. It is also contemplated that the arm portions 52 may be omitted.

Figure 4:
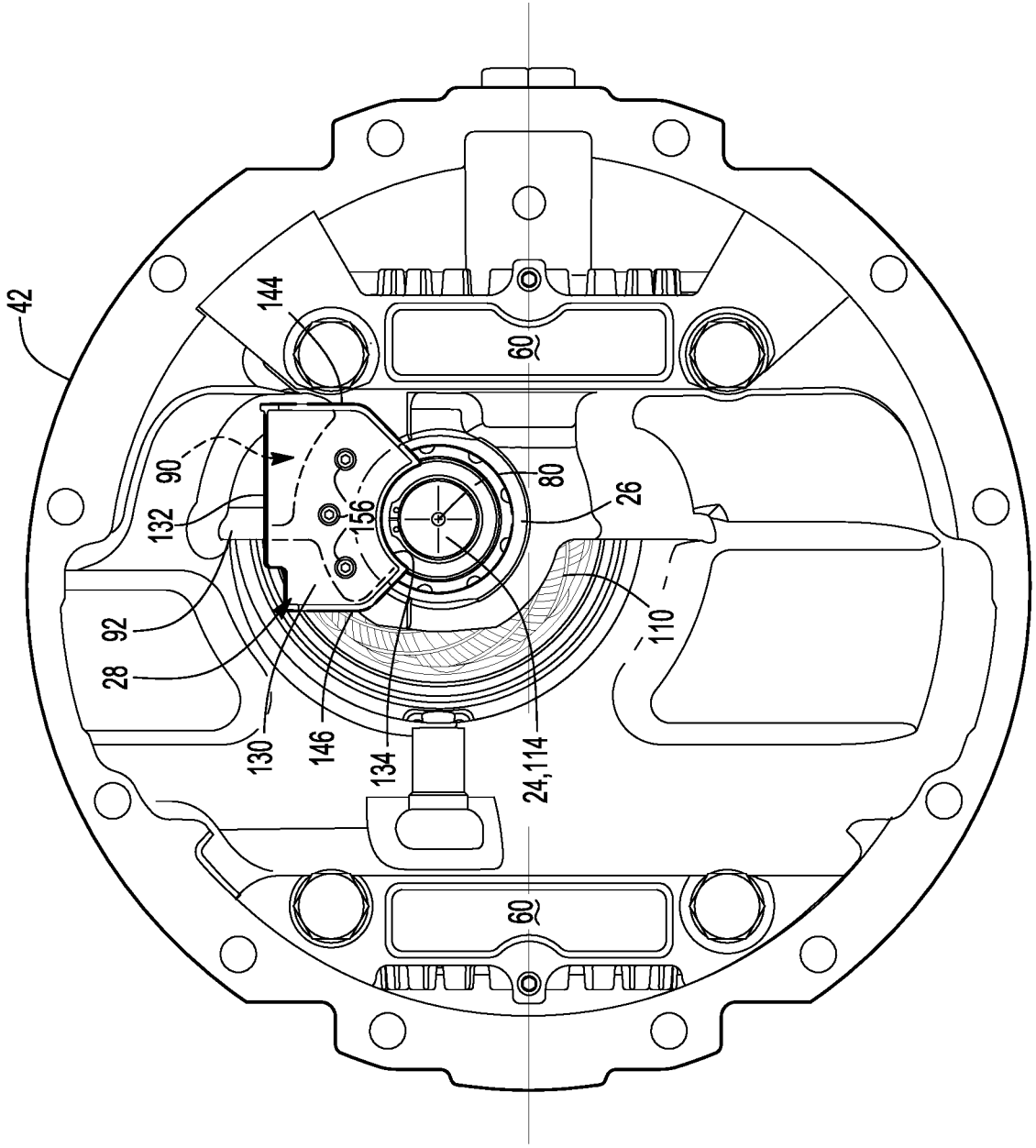
FIG. 4 is a side view of a portion of the axle assembly with a differential assembly, axle shafts, and axle housing omitted to better show a lubricant deflector.

Referring to FIGS. 1 and 2, the differential carrier 42 is mounted to the axle housing 40. For instance, the differential carrier 42 may be mounted to the center portion 50 of the axle housing 40. The differential carrier 42 supports the differential assembly 22. For example, the differential carrier 42 may include one or more bearing supports 60 (which are best shown in FIG. 4 without the differential assembly 22) that may support a bearing, such as a roller bearing assembly, that rotatably supports the differential assembly 22. The differential carrier 42 may cooperate with the axle housing 40 to define the sump portion 54. In at least one configuration, the differential carrier 42 may include the first spigot bearing support wall 62, a second spigot bearing support wall 64, and a third spigot bearing support wall 66, and an exterior wall 68.

Figure 3:
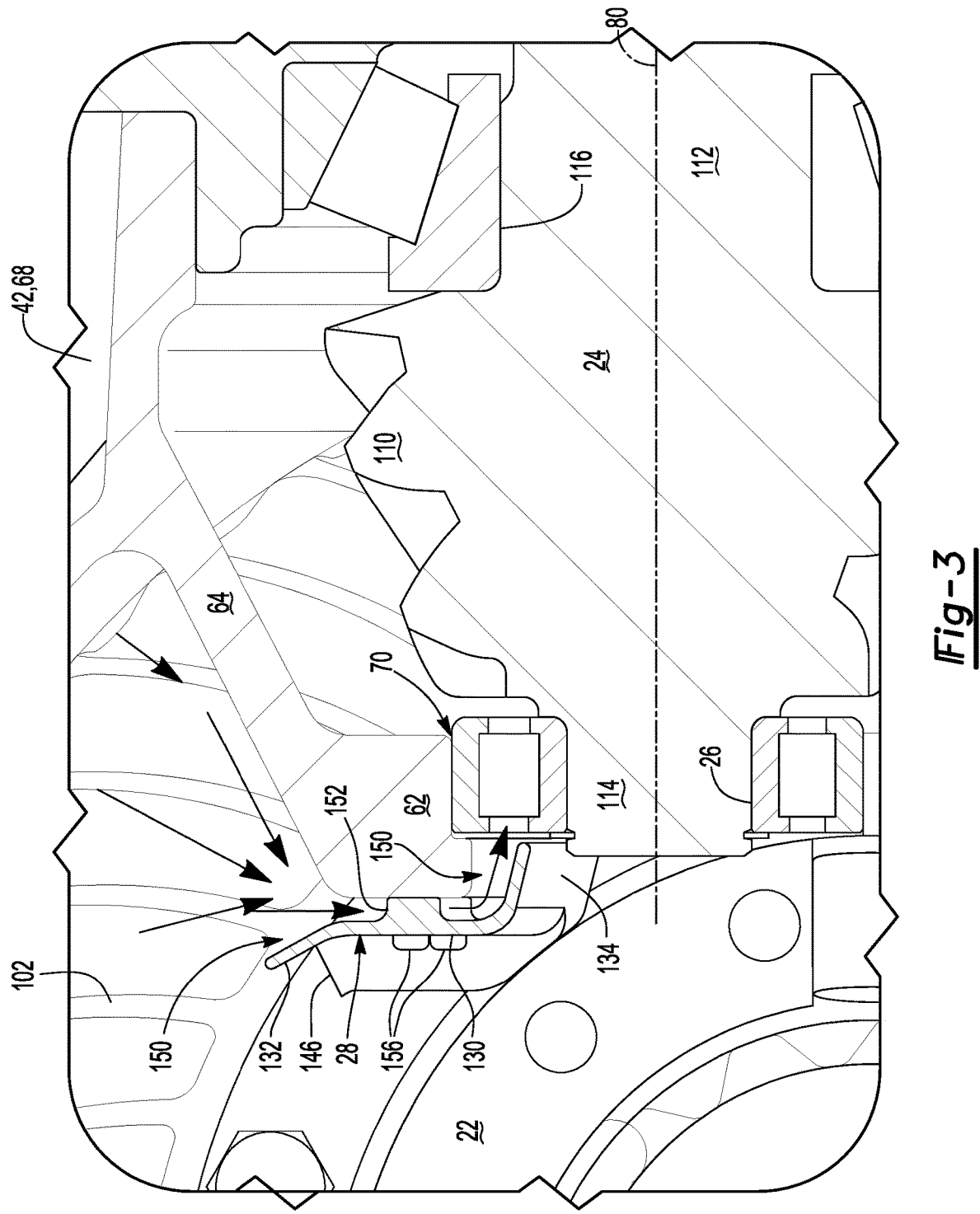
FIG. 3 is a magnified view of a portion of FIG. 3.

Referring primarily to FIGS. 2 and 3, the first spigot bearing support wall 62 may encircle the spigot bearing 26. The lubricant deflector 28 may be mounted to the first spigot bearing support wall 62. The first spigot bearing support wall 62 may define an aperture 70 that may receive and encircle the spigot bearing 26 and a spigot 114 of the drive pinion 24. The aperture 70 may be configured as a through hole. In at least one configuration, the first spigot bearing support wall 62 may be disposed substantially perpendicular to a drive pinion axis 80 about which the drive pinion 24 may rotate. The term "substantially perpendicular" is used herein to designate features or axes that are the same as or very close to perpendicular and includes features that are within ±3° of being perpendicular each other.

Figure 5:
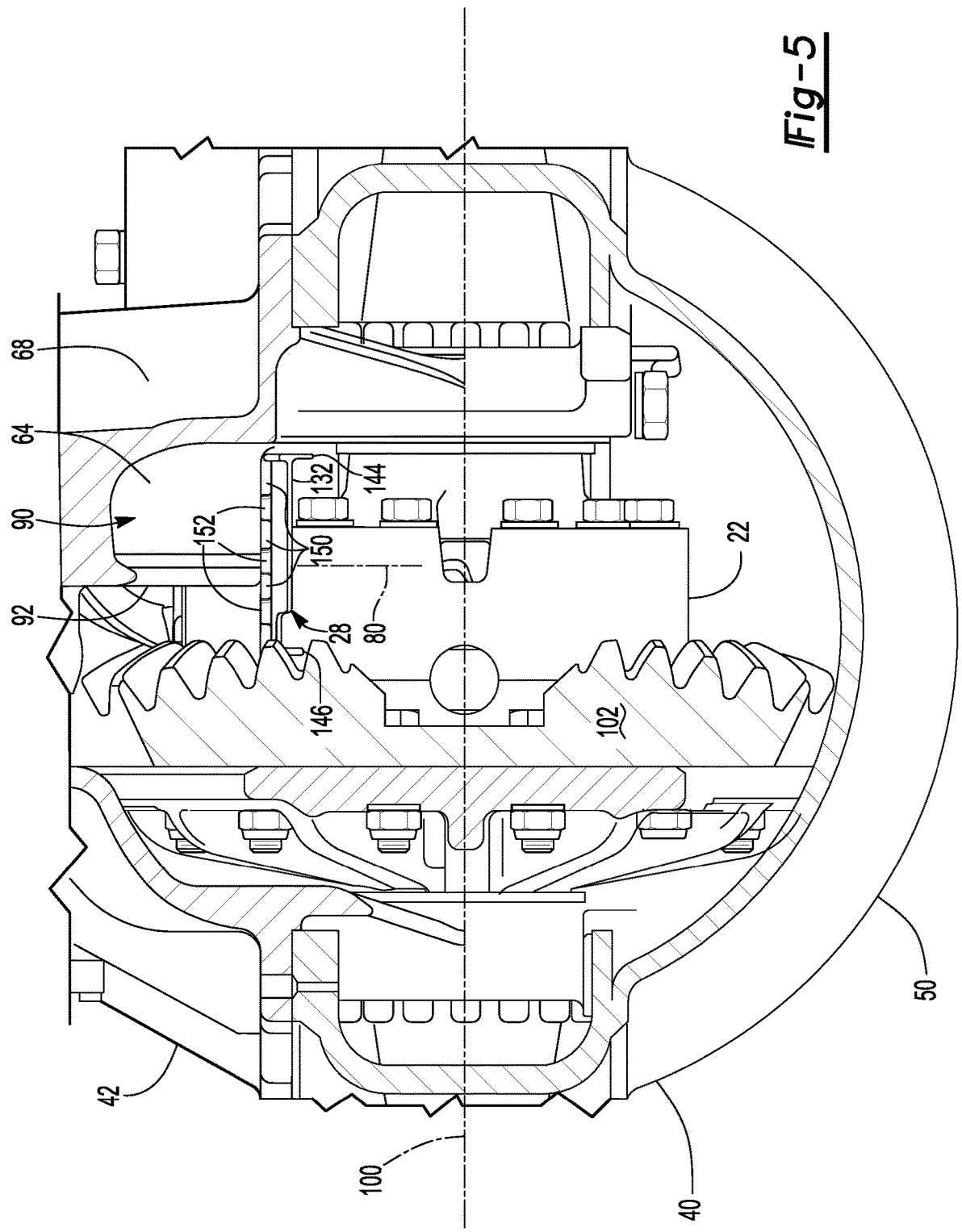
FIG. 5 is a section view of the axle assembly along section line 5-5.

Referring primarily to FIGS. 2, 3, and 5, the second spigot bearing support wall 64 may extend from the first spigot bearing support wall 62. For instance, the second spigot bearing support wall 64 may extend from an upper end of the first spigot bearing support wall 62 that is disposed above the spigot bearing 26 to the exterior wall 68 of the differential carrier 42. As such, the second spigot bearing support wall 64 may be disposed above the drive pinion 24. As is best shown in FIG. 3, the second spigot bearing support wall 64 may be disposed at an oblique angle with respect to the drive pinion axis 80. For example, the second spigot bearing support wall 64 may extend farther away from the drive pinion axis 80 as the distance from the first spigot bearing support wall 62 increases or as the second spigot bearing support wall 64 extends to the right from the perspective shown in FIG. 3. In at least one configuration and as is best shown in FIGS. 4 and 5, the second spigot bearing support wall 64 may define a trench 90 and may include a rib 92.

The trench 90 may route lubricant 56 toward the lubricant deflector 28. For instance, the trench 90 may be sloped to extend downward as the trench 90 extends toward the lubricant deflector 28. The trench 90 is partially hidden behind the lubricant deflector 28 in FIG. 4. In at least one configuration, the bottom side of the trench 90 may extend along an arc and may be radially disposed with respect to the drive pinion axis 80. The trench 90 may be partially bounded by the exterior wall 68 of the differential carrier 42 and the rib 92.

The rib 92 may partially define the trench 90. The rib 92 may extend away from the drive pinion 24. For instance, the rib 92 may be disposed above the drive pinion axis 80. In the configuration shown in FIG. 4, the rib 92 is disposed directly above the drive pinion axis 80 and extends in an upward direction away from the drive pinion axis 80.

Referring primarily to FIG. 2, the third spigot bearing support wall 66 may extend from the first spigot bearing support wall 62. For instance, the third spigot bearing support wall 66 may extend from a lower end of the first spigot bearing support wall 62 that is disposed below the spigot bearing 26 to or toward the exterior wall 68 of the differential carrier 42. As such, the third spigot bearing support wall 66 may be disposed below the drive pinion 24. The third spigot bearing support wall 66 may be disposed at an oblique angle with respect to the drive pinion axis 80. For example, the third spigot bearing support wall 66 may extend farther away from the drive pinion axis 80 as the distance from the first spigot bearing support wall 62 increases or as the third spigot bearing support wall 66 extends to the right from the perspective shown in FIG. 2.

The exterior wall 68 may at least partially define an exterior side of the differential carrier 42.

The differential assembly 22 is mounted to the differential carrier 42. The differential assembly 22 may be received in the center portion 50 of the axle housing 40. The differential assembly 22 is rotatable about a differential axis 100. The differential axis 100 may be disposed substantially perpendicular to the drive pinion axis 80 and may be disposed below the drive pinion axis 80.

The differential assembly 22 transmits torque between a torque source, such as an internal combustion engine or electrical machine like an electric motor, and the axle shafts 30. For instance, the differential assembly 22 may be configured to transmit torque to the axle shafts 30, wheel hubs, and wheels of the vehicle. The differential assembly 22 may be operatively connected to the axle shafts 30 and may permit the axle shafts 30 to rotate at different rotational speeds in a manner known by those skilled in the art. The differential assembly 22 has a ring gear 102 that may have teeth that are arranged around the differential axis 100 and that engage teeth of the drive pinion 24. Accordingly, the differential assembly 22 may receive torque from the drive pinion 24 via the ring gear 102 and transmit torque to the axle shafts 30.

Referring to FIGS. 2 and 3, the drive pinion 24 is operatively connectable to the torque source and is rotatable about the drive pinion axis 80. In at least one configuration, the drive pinion 24 includes a gear portion 110, a shaft portion 112, and a spigot 114.

The gear portion 110 has teeth that are arranged around the drive pinion axis 80. The teeth of the gear portion 110 mesh with the teeth of the ring gear 102 of the differential assembly 22. The gear portion 110 may be tapered toward the spigot 114 such that the gear portion 110 becomes closer to the drive pinion axis 80 as the gear portion extends away from the shaft portion 112 and toward the spigot 114.

The shaft portion 112 extends from the gear portion 110 in a direction that extends away from the differential assembly 22. The shaft portion 112 may extend along the drive pinion axis 80. The shaft portion 112 may be integrally formed with the gear portion 110. The shaft portion 112 may be rotatably supported by one or more drive pinion bearings 116. The shaft portion 112 may be operatively connected to the torque source. For example, the shaft portion 112 may be directly or indirectly coupled to a yoke 120 in a configuration in which the torque source is not provided with the axle assembly 10 or is remotely positioned from the axle assembly 10.

The spigot 114 extends from the gear portion 110 in a direction that extends toward the differential assembly 22. The spigot 114 may extend along the drive pinion axis 80 and may be disposed on an opposite side of the gear portion 110 from the shaft portion 112. In addition, the spigot 114 may have a smaller diameter and a shorter axial length than the shaft portion 112. The spigot 114 may be integrally formed with the gear portion 110. As is best shown in FIG. 2, the spigot 114 may be disposed above the differential axis 100.

The spigot bearing 26 rotatably supports the spigot 114. The spigot bearing 26 is disposed on the differential carrier 42. For instance, the spigot bearing 26 may be disposed in the aperture 70 of the first spigot bearing support wall 62. The spigot bearing 26 may have any suitable configuration. For example, the spigot bearing 26 may be configured as a roller bearing assembly that may encircle and engage the spigot 114. In such a configuration, the spigot bearing 26 may have an inner race, an outer race, and a plurality of bearing elements. The inner race may encircle and may contact or engage the spigot 114. The outer race may encircle the bearing elements and the inner race and may contact or engage the first spigot bearing support wall 62. The bearing elements may extend between the inner race and the outer race and facilitate rotation of the inner race with respect to the outer race. As is best shown in FIG. 2, the spigot bearing 26 may be disposed above the differential axis 100.

Referring to FIGS. 2 and 3, the lubricant deflector 28 is mounted to the differential carrier 42. For instance, the lubricant deflector 28 may be mounted to the first spigot bearing support wall 62. In addition, the lubricant deflector 28 may be mounted on a side of the first spigot bearing support wall 62 that faces toward the differential assembly 22.

The lubricant deflector 28 directs lubricant 56 toward the spigot bearing 26. For example, the lubricant deflector 28 may direct lubricant 56 that is splashed or sprayed by the ring gear 102 of the differential assembly 22 toward the spigot bearing 26. The lubricant deflector 28 may help capture splashed or sprayed lubricant when the differential assembly 22 rotates about the differential axis 100 in either a clockwise or counterclockwise direction from the perspective shown in FIG. 2. Splashed or sprayed lubricant may be directly splashed or sprayed onto the lubricant deflector 28 or may be splashed or sprayed onto another component of the axle assembly 10 and then flow, drip or otherwise be routed toward the lubricant deflector 28. The lubricant deflector 28 helps capture and direct more lubricant 56 to the spigot bearing 26 as compared to a configuration in which the lubricant deflector 28 is not provided.

Referring to FIG. 2, the lubricant deflector 28 may be positioned above a portion of the drive pinion 24, such as the spigot 114, and may be axially positioned or positioned along the drive pinion axis 80 closer to the differential assembly 22 than the spigot bearing 26. The lubricant deflector 28 may be elevated or positioned above the differential axis 100.

Referring to FIG. 4, a side view of the differential carrier 42 is shown with the differential assembly 22 omitted to better show the lubricant deflector 28. The lubricant deflector 28 is positioned above the drive pinion axis 80. The lubricant deflector 28 may be positioned above the spigot 114 and the drive pinion axis 80.

Referring primarily to FIGS. 6-9, an example of the lubricant deflector 28 is shown in more detail. The lubricant deflector 28 may include a plurality of panels, such as a first panel 130, a second panel 132, a third panel 134 or combinations thereof. The lubricant deflector 28 may also include a first side flange 140, a second side flange 142, a third side flange 144, a fourth side flange 146, or combinations thereof.

Referring primarily to FIG. 3, the first panel 130 is mountable to the differential carrier 42. For instance, the first panel 130 may be mountable to the first spigot bearing support wall 62. In at least one configuration, the first panel 130 may extend in a generally vertical direction. For example, the first panel 130 may be disposed substantially perpendicular to the drive pinion axis 80. In at least one configuration, the first panel 130 is spaced apart from the first spigot bearing support wall 62 such that a gap 150 is provided between the first panel 130 and the first spigot bearing support wall 62. Lubricant 56 passes between the first panel 130 and the first spigot bearing support wall 62 and through the gap 150 to reach the spigot bearing 26.

Figure 7:
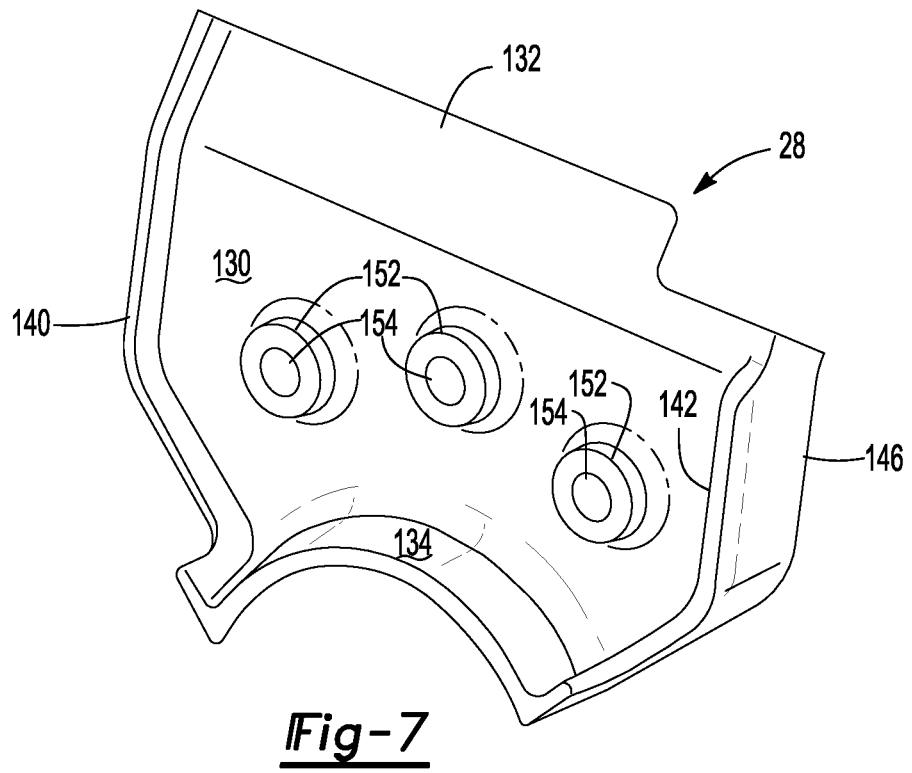

Referring primarily to FIGS. 3 and 7, one or more bosses 152 may extend from the first panel 130. In the configuration shown, three bosses 152 are illustrated; however, it is contemplated that a greater or lesser number of bosses may be provided. A boss 152 may extend between the first panel 130 and the differential carrier 42. For example, a boss 152 may extend from the first panel 130 to the first spigot bearing support wall 62. As such, a boss 152 may help separate the first panel 130 from the first spigot bearing support wall 62. A boss 152 may have any suitable configuration. In the configuration shown, the bosses 152 have a generally cylindrical configuration and have a hole 154 that may receive a fastener 156 that may couple the boss 152 to the differential carrier 42. In at least one configuration, the boss 152 may encircle the fastener 156. The second panel 132 may be angled to extend over the fasteners 156.

Figures 8, 9:
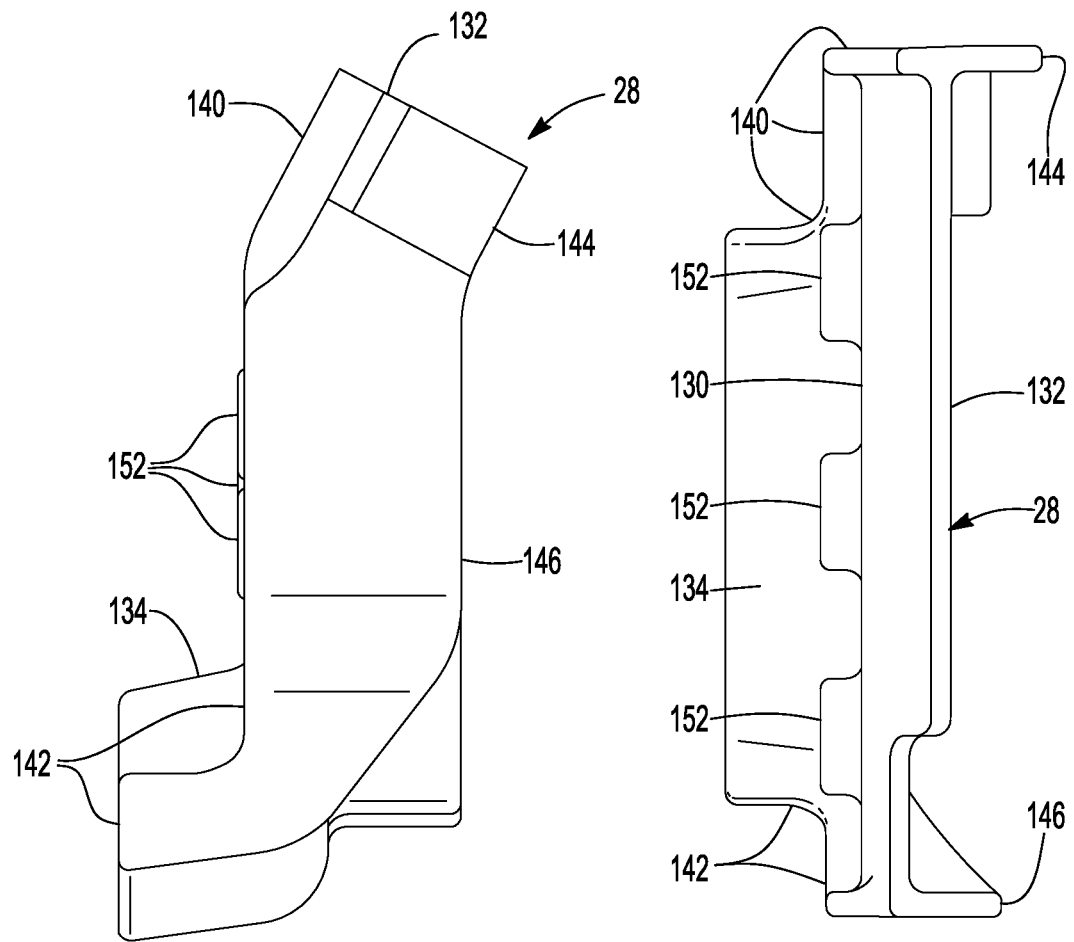
FIG. 8 is a side view of the lubricant deflector.
FIG. 9 is a top view of the lubricant deflector.

Referring primarily to FIGS. 3, 7, and 8, second panel 132 may extend from the first panel 130. For instance, the second panel 132 may extend at an angle from an upper end of the first panel 130 such that the second panel 132 may extend away from the drive pinion axis 80 and away from the spigot bearing 26. As such, the second panel 132 may be oriented to help capture a larger volume of lubricant 56. The second panel 132 may have a generally planar configuration in one or more embodiments. The second panel 132 may be spaced apart from the differential carrier 42 and the first spigot bearing support wall 62.

The third panel 134 may extend from the first panel 130. For instance, the third panel 134 may extend at an angle from a lower end of the first panel 130 toward the spigot bearing 26 and the drive pinion axis 80. As such, the third panel 134 may be disposed at an opposite end of the first panel 130 from the second panel 132. As is best shown in FIG. 3, the second panel 132 and the third panel 134 may extend in generally opposite directions from the first panel 130. The third panel 134 may be spaced apart from the first spigot bearing support wall 62 to effectively extend the gap 150 toward the spigot bearing 26. The third panel 134 may be oriented to direct lubricant 56 that passes through the gap 150 toward the spigot bearing 26. As is best shown with reference to FIGS. 4 and 7, the third panel 134 may extend along an arc. For example, the arc may be radially disposed with respect to the drive pinion axis 80.

Referring primarily to FIGS. 7 and 9, the first side flange 140 helps capture lubricant 56. The first side flange 140 may be disposed along a portion of the perimeter of the lubricant deflector 28. The first side flange 140 may extend from one or more panels of the lubricant deflector 28 in a direction that extends away from the differential assembly 22 and toward the first spigot bearing support wall 62. For instance, the first side flange 140 may extend from the first panel 130, the second panel 132, the third panel 134, or combinations thereof. In the configuration shown, the first side flange 140 extends from the first panel 130, the second panel 132, and the third panel 134.

The second side flange 142 may also help capture lubricant 56. The second side flange 142 may be disposed along a portion of the perimeter of the lubricant deflector 28 that may be disposed opposite the first side flange 140. The second side flange 142 may extend from one or more panels of the lubricant deflector 28 in a direction that extends away from the differential assembly 22 and toward the first spigot bearing support wall 62. For instance, the second side flange 142 may extend from the first panel 130, the second panel 132, the third panel 134, or combinations thereof. In the configuration shown, the first side flange 140 extends from the first panel 130, the second panel 132, and the third panel 134.

Figure 6:
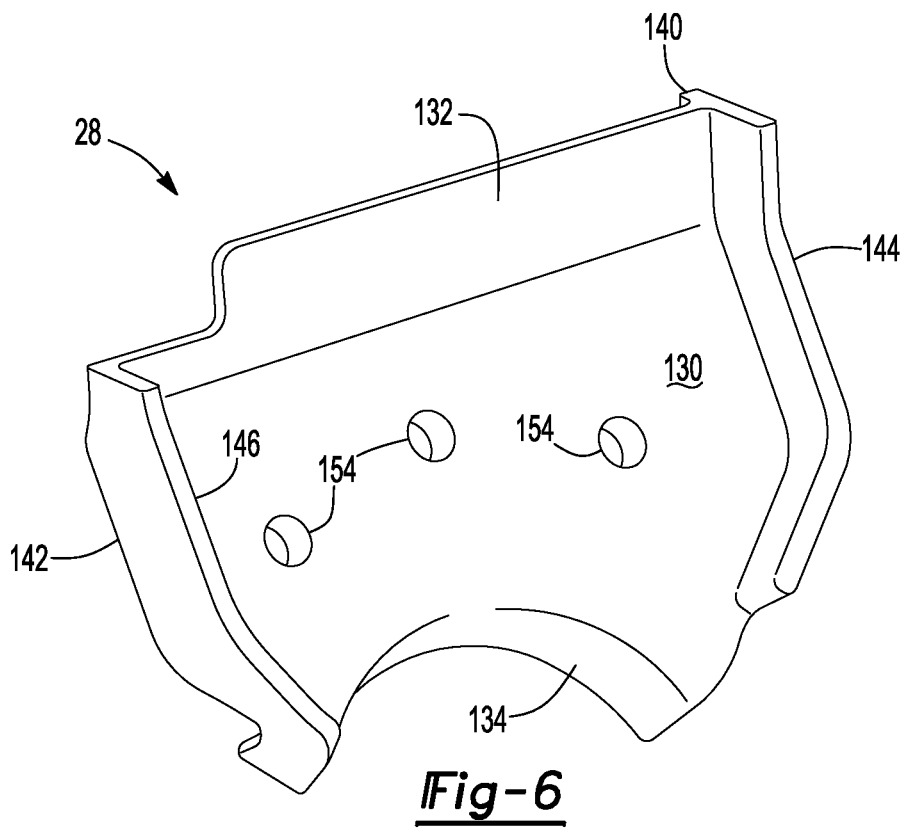
FIGS. 6 and 7 are perspective views of the lubricant deflector.

Referring primarily to FIGS. 6 and 9, the third side flange 144, if provided, may help reinforce the lubricant deflector 28. The third side flange 144 may be disposed along a portion of the perimeter of the lubricant deflector 28. The third side flange 144 may extend from one or more panels of the lubricant deflector 28 in a direction that extends toward the differential assembly 22 and away from the first spigot bearing support wall 62. For instance, the third side flange 144 may extend from the first panel 130, the second panel 132, the third panel 134, or combinations thereof. In the configuration shown, the third side flange 144 extends from the first panel 130 and the second panel 132 but not the third panel 134. The third side flange 144 may be disposed opposite the first side flange 140. As such, the first side flange 140 and the third side flange 144 may extend in opposite directions from each other.

The fourth side flange 146, if provided, may help reinforce the lubricant deflector 28. The fourth side flange 146 may be disposed along a portion of the perimeter of the lubricant deflector 28. The fourth side flange 146 may extend from one or more panels of the lubricant deflector 28 in a direction that extends toward the differential assembly 22 and away from the first spigot bearing support wall 62. For instance, the fourth side flange 146 may extend from the first panel 130, the second panel 132, the third panel 134, or combinations thereof. In the configuration shown, the fourth side flange 146 extends from the first panel 130, the second panel 132, and the third panel 134. The fourth side flange 146 may be disposed opposite the second side flange 142. As such, the second side flange 142 and the fourth side flange 146 may extend in opposite directions from each other.

Referring to FIG. 3, the straight arrowed lines represent some examples how lubricant 56 may be directed by the lubricant deflector 28 to the spigot bearing 26. For instance, lubricant 56 is flung, splashed, or sprayed by differential assembly 22, such as by the ring gear 102, may be directed upward toward internal surfaces of the axle housing 40 in the differential carrier 42. Some lubricant 56 may be directed into or may drip into the trench 90 (which is best shown in FIGS. 4 and 5) and may flow down the trench 90 under the force of gravity and into the gap 150 between the lubricant deflector 28 and the first spigot bearing support wall 62. Lubricant 56 may also be flung, splashed, or sprayed onto the second panel 132 of the lubricant deflector 28 and flow down the second panel 132 under the force of gravity and into the gap 150. Lubricant may also be flung, splashed, or sprayed into or may drip directly into the gap 150. Lubricant 56 may then flow around the bosses 152 and through the gap 150 to reach the third panel 134. The third panel 134 may then direct lubricant 56 toward or to the spigot bearing 26 to facilitate rotation of the bearing elements of the spigot bearing 26. Some lubricant 56 may flow through or may be pumped through the spigot bearing 26. Lubricant 56 may flow back to the sump portion 54 under the force of gravity to facilitate recirculation of the lubricant 56.

Referring primarily to FIG. 1, the axle shafts 30 transmit torque from the differential assembly 22 to corresponding wheel hubs and wheels. Two axle shafts 30 may be provided such that each axle shaft 30 extends through a different arm portion 52 of axle housing 40. The axle shafts 30 may extend along and may be rotatable about an axis, such as the wheel axis or the differential axis 100, which may or may not be coaxially disposed. As an example, an axle shaft 30 may have a first end and a second end. The first end may be operatively connected to the differential assembly 22. The second end may be disposed opposite the first end and may be operatively connected to a corresponding wheel hub. Optionally, gear reduction may be provided between an axle shaft 30 and a wheel.

An axle assembly as described above may help direct lubricant to a spigot bearing that rotatably supports a spigot of a drive pinion. Thus, the lubricant deflector may help better capture lubricant and provide sufficient lubrication to the spigot bearing, which may help facilitate heat transfer and improve spigot bearing life. As a result, the present invention solves problems associated with providing an adequate lubricant to the spigot bearing, such as may occur when the drive pinion is located in a "high entry" location in which the drive pinion or a portion thereof is located above the differential axis. The lubricant deflector may be added to various differential carrier designs that are configured to support a spigot bearing without developing or designing a new differential carrier design, thereby providing a cost-effective way to lubricate a spigot bearing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a housing assembly that includes an axle housing and a differential carrier that is mounted to the axle housing, wherein the axle housing comprises a sump portion that receives lubricant;
    a differential assembly that is mounted to the differential carrier and that is rotatable about a differential axis, wherein the differential assembly comprises a ring gear;
    a drive pinion that is rotatable about a drive pinion axis and that comprises a gear portion that meshes with the ring gear, a shaft portion that extends from the gear portion away from the differential assembly, and a spigot that extends from the gear portion toward the differential assembly;
    a spigot bearing that is disposed on the differential carrier and that rotatably supports the spigot; and
    a lubricant deflector that is mounted to the differential carrier, wherein the lubricant deflector is configured to direct lubricant to the spigot bearing, the differential carrier includes a first spigot bearing support wall that encircles the spigot bearing, and the lubricant deflector is mounted to the first spigot bearing support wall.

2. The axle assembly of claim 1 wherein the lubricant deflector is configured to direct lubricant that is splashed or sprayed by the ring gear to the spigot bearing.

3. The axle assembly of claim 1 wherein the spigot, the spigot bearing, and the lubricant deflector are disposed above the differential axis.

4. The axle assembly of claim 1 wherein the differential carrier includes a second spigot bearing support wall that extends from the first spigot bearing support wall to an exterior wall of the differential carrier, wherein the second spigot bearing support wall defines a trench that routes lubricant toward the lubricant deflector.

5. The axle assembly of claim 4 wherein the second spigot bearing support wall is disposed above the drive pinion and is disposed at an oblique angle with respect to the drive pinion axis.

6. The axle assembly of claim 4 wherein the second spigot bearing support wall includes a rib that extends away from the drive pinion and that partially defines the trench.

7. The axle assembly of claim 6 wherein the rib is disposed above the drive pinion axis.

8. The axle assembly of claim 4 wherein the differential carrier includes a third spigot bearing support wall that extends from the first spigot bearing support wall and is disposed below the drive pinion, and the second spigot bearing support wall and the third spigot bearing support wall extend farther from the drive pinion axis as a distance from the first spigot bearing support wall increases.

9. The axle assembly of claim 1 wherein the lubricant deflector includes a first panel and a boss that extends between the first panel and the differential carrier.

10. An axle assembly comprising:
    a housing assembly that includes an axle housing and a differential carrier that is mounted to the axle housing, wherein the axle housing comprises a sump portion that receives lubricant;

a differential assembly that is mounted to the differential carrier and that is rotatable about a differential axis, wherein the differential assembly comprises a ring gear;

a drive pinion that is rotatable about a drive pinion axis and that comprises a gear portion that meshes with the ring gear, a shaft portion that extends from the gear portion away from the differential assembly, and a spigot that extends from the gear portion toward the differential assembly;

a spigot bearing that is disposed on the differential carrier and that rotatably supports the spigot; and a lubricant deflector that is mounted to the differential carrier, wherein the lubricant deflector is configured to direct lubricant to the spigot bearing, the lubricant deflector includes a first panel and a boss that extends between the first panel and the differential carrier, and the first panel is spaced apart from the differential carrier to provide a gap that is configured to allow lubricant to pass between the first panel and the differential carrier.

11. The axle assembly of claim 10 wherein the differential carrier includes a first spigot bearing support wall that encircles the spigot bearing, wherein the lubricant deflector is mounted to the first spigot bearing support wall.

12. The axle assembly of claim 10 wherein a fastener couples the boss to the differential carrier.

13. The axle assembly of claim 12 wherein the boss encircles the fastener.

14. The axle assembly of claim 10 wherein the lubricant deflector includes a third panel that extends from the first panel toward the spigot bearing and first and second side flanges that are disposed opposite each other and that extend from the first panel and the third panel, wherein the first and second side flanges extend away from the differential assembly.

15. The axle assembly of claim 14 wherein the lubricant deflector includes third and fourth side flanges that are spaced apart from each other and that extend from the first panel toward the differential assembly.

16. The axle assembly of claim 15 wherein the first side flange is disposed opposite the third side flange and the second side flange is disposed opposite the fourth side flange.

17. An axle assembly comprising:

a housing assembly that includes an axle housing and a differential carrier that is mounted to the axle housing, wherein the axle housing comprises a sump portion that receives lubricant;

a differential assembly that is mounted to the differential carrier and that is rotatable about a differential axis, wherein the differential assembly comprises a ring gear;

a drive pinion that is rotatable about a drive pinion axis and that comprises a gear portion that meshes with the ring gear, a shaft portion that extends from the gear portion away from the differential assembly, and a spigot that extends from the gear portion toward the differential assembly;

a spigot bearing that is disposed on the differential carrier and that rotatably supports the spigot; and a lubricant deflector that is mounted to the differential carrier, wherein the lubricant deflector is configured to direct lubricant to the spigot bearing, the lubricant deflector comprising a first panel and a second panel that extends at an angle from the first panel such that the second panel extends away from the drive pinion axis and the spigot bearing.

18. The axle assembly of claim 17 wherein the lubricant deflector includes a third panel that extends from the first panel toward the spigot bearing.

19. The axle assembly of claim 18 wherein the third panel extends along an arc.

20. The axle assembly of claim 18 wherein the third panel is radially disposed with respect to the drive pinion axis.

21. A lubricant deflector comprising:

a first panel adapted to be mounted to a differential carrier, the first panel comprising a first side, a second side disposed opposite the first side, and a boss that protrudes from the first side in a first direction, the boss comprising a hole that is adapted to receive a first fastener;

a second panel that extends at an angle less than 90 degrees from a plane of the first panel from an upper end of the first panel such that the second panel extends away from the first side and away from the first direction; and a third panel that extends at an angle from a lower end of the first panel that is disposed opposite the upper end, wherein the third panel extends in the first direction away from the second side.

22. The lubricant deflector of claim 21 wherein the third panel extends along an arc.

* * * * *